United States Patent [19]
Esposto

[11] Patent Number: 5,743,325
[45] Date of Patent: Apr. 28, 1998

[54] FLEXIBLE HEAT TRANSPORT DESIGN FOR DEPLOYABLE RADIATOR APPLICATIONS

[75] Inventor: David B. Esposto, Redondo Beach, Calif.

[73] Assignee: Hughes Electronics, Los Angeles, Calif.

[21] Appl. No.: 861,493

[22] Filed: May 22, 1997

Related U.S. Application Data

[63] Continuation of Ser. No. 577,440, Dec. 22, 1995, abandoned.

[51] Int. Cl.[6] .................................................. F28F 27/00
[52] U.S. Cl. .................................................. 165/41; 165/46
[58] Field of Search .................................. 165/41, 46, 82; 137/355.16, 355.28

[56] References Cited

U.S. PATENT DOCUMENTS

| | | | |
|---|---|---|---|
| 1,750,964 | 3/1930 | Nuhring | 137/355.28 |
| 1,844,259 | 2/1932 | Meyer | 137/355.28 |
| 2,334,141 | 11/1943 | Zierden | 137/355.28 |
| 2,634,071 | 4/1953 | Lund | 137/355.28 |
| 2,686,644 | 8/1954 | Pratt | 137/355.28 |
| 3,670,763 | 6/1972 | Magdars | 137/355.28 X |
| 3,736,952 | 6/1973 | Thompson | 137/355.28 |
| 4,815,525 | 3/1989 | Readman | 165/41 |
| 4,832,113 | 5/1989 | Mims et al. | 165/41 X |
| 4,986,346 | 1/1991 | Blackmon et al. | 165/41 X |
| 5,027,892 | 7/1991 | Bannon et al. | 165/41 |

OTHER PUBLICATIONS

Chalmers et al., Application of Capillary Pumped Loop Heat Transport Systems to Large Spacecraft, Jun. 1986, p. 10.

*Primary Examiner*—John Rivell
*Assistant Examiner*—Christopher Atkinson
*Attorney, Agent, or Firm*—Terje Gudmestad; Elizabeth E. Leitereg; Wanda K. Denson-Low

[57] ABSTRACT

A closed-loop heat pipe transport design for a deployment application having a flexible section which connects to a payload structure and a deployable structure. The flexible section folds over itself while the deployable structure is stowed. Upon rotation of the deployable structure around a predetermined axis, the flexible section unfolds, with a portion of the flexible section passing through the predetermined axis. When the deployable structure has completed its rotation and is fully deployed, the components of the flexible section will lie in substantially the same plane.

22 Claims, 3 Drawing Sheets

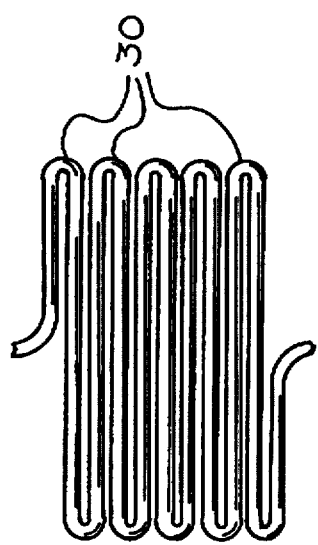
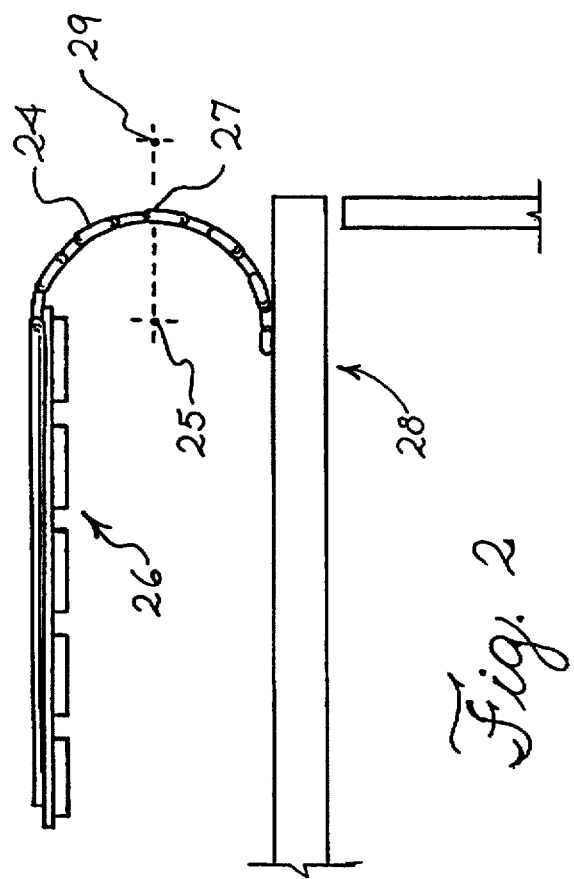
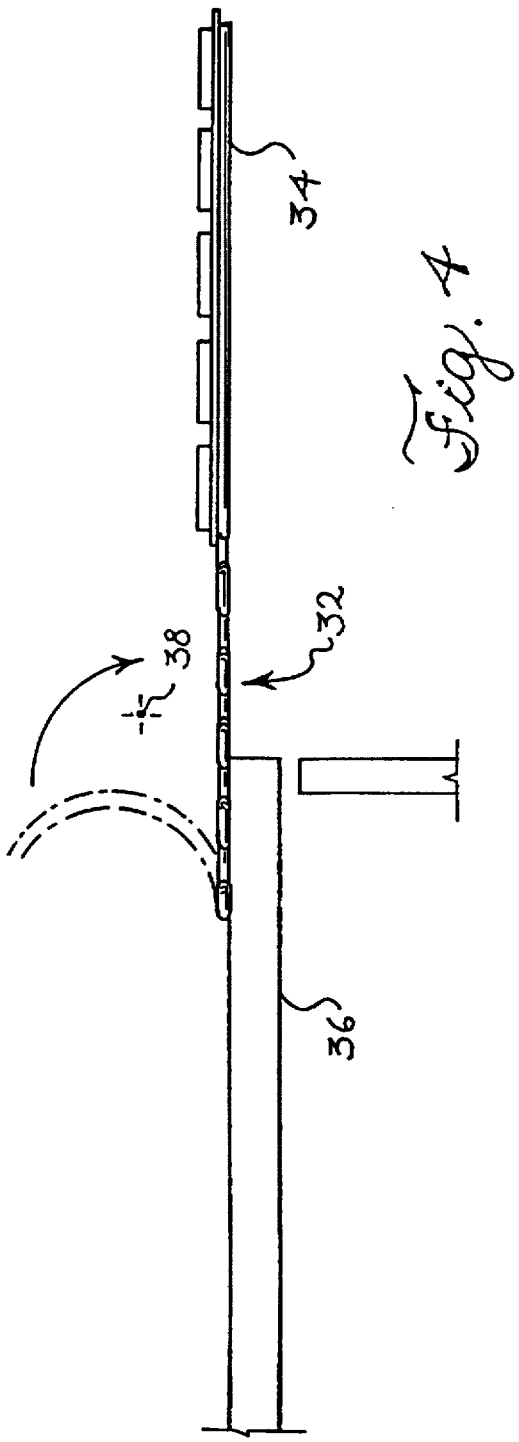

FLEXIBLE HEAT TRANSPORT DESIGN FOR DEPLOYABLE RADIATOR APPLICATIONS

This patent application is a continuation of U.S. patent application Ser. No. 08/577,440, filed on Dec. 22, 1995, now abandoned.

BACKGROUND OF THE INVENTION

I. Field of the Invention

The present invention relates to radiator systems on spacecraft. More specifically, the present invention relates to a flexible heat transport design for deployment applications.

II. Description of the Related Art

Where a closed-loop heat pipe system is used to reject excess thermal heat from a communication satellite or any spacecraft, it is necessary for the system to have a certain amount of flexibility in allowing for deployment of radiators. In a typical closed-loop heat pipe system utilizing a two-phase capillary effect, vapor and liquid lines are used to continuously move unwanted thermal energy from a heat source to a radiator. Deployable radiators, as they are known in the art, are used to increase the heat rejection capability of a closed-loop heat pipe system. Deployable radiators reside on the exterior of the spacecraft and are coupled to the spacecraft payload structure by a hinge or multiple hinges. The deployable radiators are stowed and folded over the exterior of the spacecraft during launch and deployed in space after launch.

Because of the rigid, fixed, axial rotation of a radiator during deployment, any attached flexible tubes are subject to overstressing and possible collapse. Collapse of tubes in a closed-loop heat pipe system will negatively affect the system's heat rejection capability. Also, because closed-loop heat pipe systems require adiabatic sections of significant length and durability, compact designs for these systems are highly desirable. It is well-known in the art to provide deployable radiators with a flexible tubing section that provides strain relief and a bias for assisting in deploying the radiator. Known methods of providing a flexible section of tubing are discussed in U.S. Pat. Nos. 3,563,307 and 5,117, 901. Both of these patents utilize a helically coiled segment of tubing wound about the hinge axis upon which the radiator rotates.

The apparatus and method of the present invention achieves a closed-loop heat pipe system that overcomes the problem of tube collapse or overstress during deployment applications. More particularly, the present invention implements a flexible serpentine shaped section that is not significantly distorted when the radiator is deployed. Also, because space is at a premium on spacecraft payload structures, the present invention's compact, lightweight design is also desirable.

SUMMARY OF THE INVENTION

The method and apparatus of the present invention utilizes a flexible serpentine-shaped section (referred to hereafter as the "serpentine section") in a closed-loop heat pipe system to permit a deployable radiator structure to be easily deployed, from a first predetermined position to a second predetermined position with respect to a spacecraft.

Deployable radiators are located on the exterior of the spacecraft and are coupled to fixed radiators or other spacecraft structures by hinges. Portions of the serpentine section of the heat pipe may be offset from or aligned with the hinge axis upon which a deployable radiator will rotate. The flexible serpentine section does not have a fixed axis of rotation, as does the hinge, because the serpentine section is secured to the payload structure on one end and to the deployable radiator on the other end. This configuration reduces the possibility of collapse of the loops in the serpentine section and allows more lateral flexibility than previous designs. Increased lateral flexibility is important from a design standpoint because it is sometimes difficult to get hardware and other equipment in position to rotate on a fixed axis. Because the serpentine section can be positioned in many places relative to the hinge axis, has repeated flexible U-shaped curves, and lays over itself in the stowed position, a more compact closed-loop heat pipe design can be achieved. The flexibility of the serpentine section also eliminates the need for a bellows tube or other type of seals which in the past have been susceptible to leakage.

In an exemplary embodiment, a deployable radiator is folded or in the "stowed" configuration when the spacecraft is launched. The deployable radiator is folded on top of the fixed radiator. The deployable radiator is secured to the spacecraft with launch locks, and is deployed by opening the locks after launch. Once the locks are opened, the serpentine section facilitates deployment of the radiator by decompressing from its stowed position. Because the serpentine section is flexibly attached to the fixed radiator on one end and to the deployable radiator on the other end, the serpentine section does not significantly distort during radiator deployment. The radiator thereafter remains deployed for the duration of the mission.

DETAILED DESCRIPTION OF THE DRAWINGS

FIG. 2 is an illustration of a serpentine section in the stowed position, with a side view of the serpentine section, in accord with a preferred embodiment of the invention.

FIG. 3 is a side view of the serpentine section of FIG. 2 while in the stowed position, in accord with a preferred embodiment of the invention.

FIG. 4 is an illustration of the path of a serpentine section relative to a hinge axis, in accord with a preferred embodiment of the invention.

DETAILED DESCRIPTION

Figure 1:
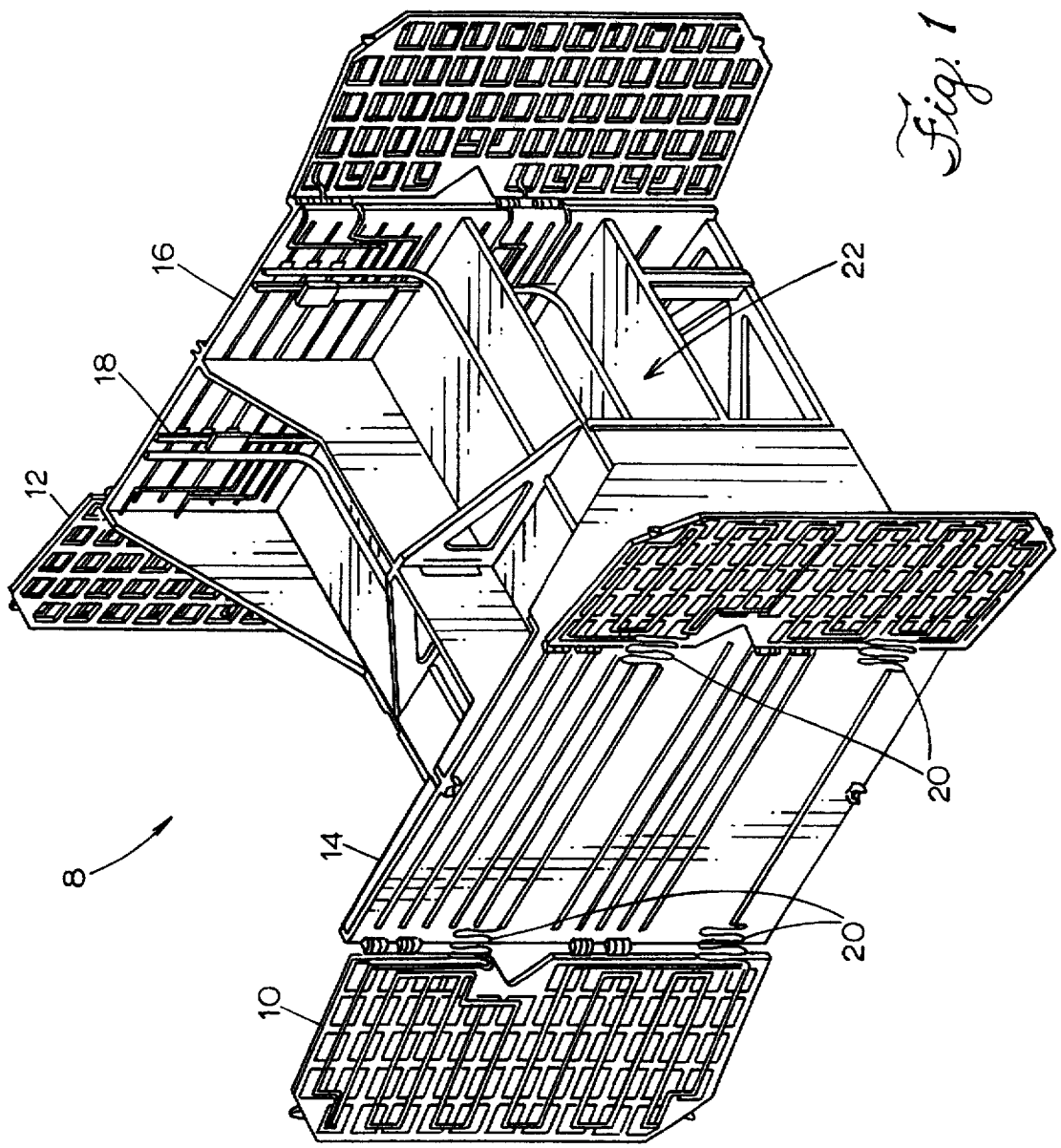
FIG. 1 is an illustration of a payload structure showing several possible positions of serpentine sections in a deployable radiator design.

An exemplary deployable radiator system in which the present invention is embodied is illustrated in FIG. 1. While the present invention could be used on any number of spacecraft, the radiator system here is utilized on a satellite communication payload structure.

An illustration of the path of fluid in a closed-loop heat pipe system embodying the present invention is herein described. There is an evaporator from which heat from a heat source is absorbed. A fluid is drawn into capillary passages of the evaporator, vaporized, and then transported via a vapor line to the condensation section where the vapor is converted to liquid. The vapor enters the vapor line which includes a first serpentine section and moves to the radiator where heat is rejected from the spacecraft. As the vapor cools in the condensation section it condenses to a liquid form. The liquid is transported back through a second serpentine section and returns via a liquid line to the evaporator. The flexible serpentine sections in the vapor and liquid line sections, respectively, permit the deployable radiator structure to be deployed from a first predetermined position to a second predetermined position with respect to the spacecraft. In the preferred embodiment herein disclosed, there are fixed radiators and deployable radiators on a payload structure. Typically, fixed radiators are employed on at least 2 sides of the spacecraft payload structure. Deployable radiators provide both increased radiator size and increased surface area exposure to the cool outer space, both key factors in determining the heat rejection capability of a radiator system. Both the fixed and deployable radiators work on thermophysical principles that are well-known in the art. Generally, the radiators function as heat sinks to which thermal energy, generated by equipment aboard the spacecraft, is conducted to and thereafter rejected from. Spacecraft temperature is thereby reduced. Various methods may be used to move the thermal energy from the communication equipment to the radiators. The method of the present invention, well-known in the art, uses a two-phase capillary system wherein thermal energy is moved to the radiators and thereby rejected from the spacecraft.

Figure 6:
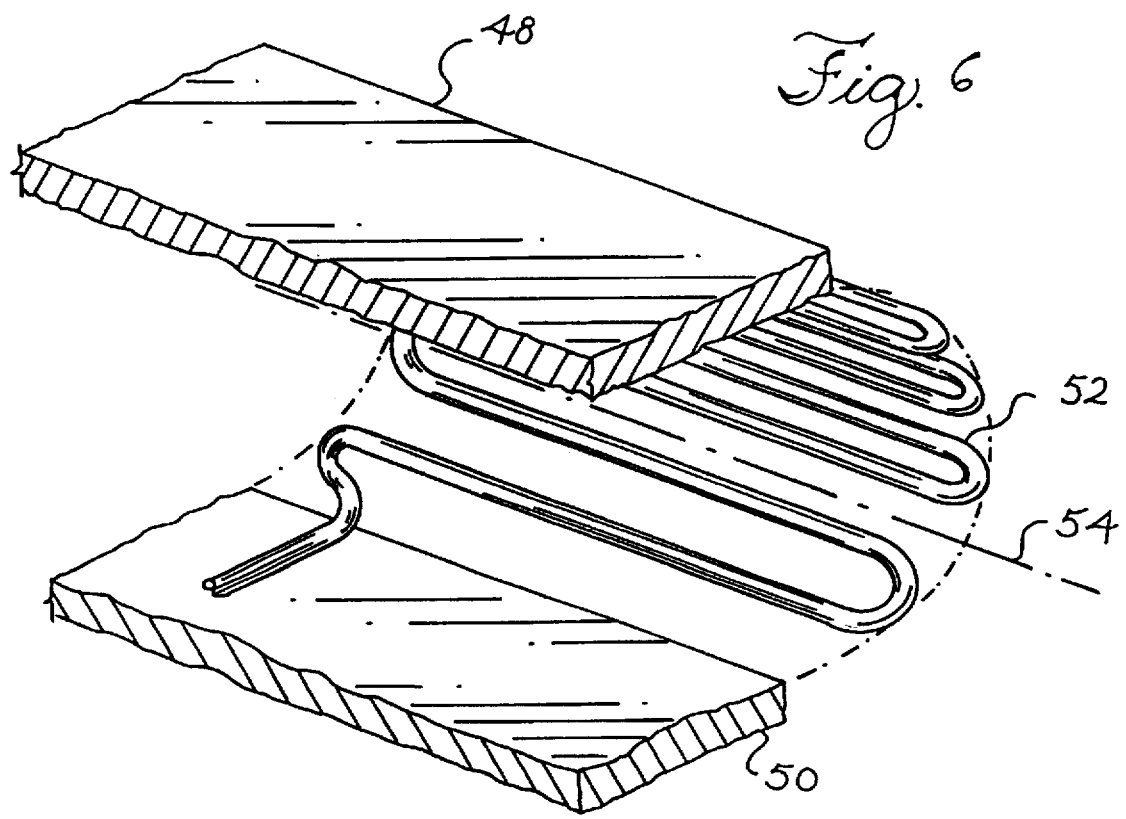
FIG. 6 is an isometric view of a serpentine section in accord with a preferred embodiment of the invention.

In the present invention, the deployable radiators begin in the folded or "stowed" position as the spacecraft is launched. The deployable radiators rest externally to the spacecraft payload structure. The deployable radiators may rest on top of a panel or a panel housing a fixed radiator. The deployable radiator itself may be some other deployable structure or a simple panel. Typically, though, there are deployable radiators on both sides of the spacecraft, on opposite sides, each coupled to a fixed radiator by at least one hinge. The hinge is connected to the outboard side of the payload structure. If a fixed panel or a fixed radiator is in place, the hinge will connect to one or the other of these. A serpentine section is fastened to the payload structure on one end and to the deployable radiator on the other end. The serpentine section is folded over itself which tends to compress its loops. FIG. 6 is an isometric view of a serpentine section 52 in the folded or stowed position, relative to an axis of rotation 54 for a deployable radiator. In accord with the preferred embodiment, the serpentine section is connected to a deployable radiator 48 and a fixed radiator 50. The fixed radiator 50, of course, could be a fixed panel and still be well within the scope of the present invention.

In the preferred embodiment, upon deployment of the radiator, the serpentine section unfolds with portions of the serpentine section passing through the axis of rotation of the hinge. Once fully deployed, the serpentine section will lie in substantially the same plane as the deployable radiator. This type of movement, while stretching the loops, does not allow the loops to collapse on themselves. For the purposes of this description, the description of the operation and makeup of one deployable radiator, serpentine section, and hinge shall apply to other deployable radiators, serpentine sections and hinges on a spacecraft unless specifically noted otherwise.

Referring to FIG. 1, a payload structure 8 for a communication satellite having six sides is shown. The payload structure has a fixed radiator panel 14 on one side and a fixed radiator panel 16 on the opposite side. The radiators in the preferred embodiment employ heat pipes 18 to carry thermal energy from the equipment modules (not shown) to the radiators. The heat pipes are tubes that transport vapor along their length to the radiators and return condensed liquid by capillary forces. The thermo-energy from the vapor is rejected from the spacecraft once it reaches the cooler radiators. As the vapor cools, it condenses to a liquid and circulates back to the modules, so that the process can repeat itself.

In the stowed position (not shown in FIG. 1), the deployable radiator has launch locks which secure the radiator during launch and transfer orbit. The launch locks are opened sometime after launch. Once the launch locks are opened, the serpentine sections of the closed-loop heat pipe system will decompress and assist in the deployment of the deployable radiator.

Several possible positions of the serpentine sections 20 are shown in FIG. 1. The serpentine section 20 is fastened on one end to the fixed radiator panel 14 and on the other end to the deployable radiator 10. The serpentine section 20 may be made of a flexible metal, such as aluminum, or other flexible material. The fixed radiator panel 14 and the fixed radiator panel 16 are exposed upon deployment of the deployable radiator 10 and deployable radiator 12, respectively. Upon deployment, each radiator works to reject unwanted heat from the spacecraft. The interior space 22 where the heat generating modules will rest is also shown.

FIG. 2 is an illustration of the positioning of a serpentine section 24 relative to hinge axis 25, hinge axis 27 and hinge axis 29, where a deployable radiator 26 is in a stowed position. FIG. 2 illustrates that the serpentine section 24 can be in front of, aligned with or in back of the axis of rotation of the deployable radiator 26. The serpentine section 24 is shown connected to a fixed radiator 28 and a deployable radiator 26, forming an arc between the fixed radiator 28 and the deployable radiator 26. FIG. 3 is a side view of the serpentine section 24 in the stowed position. FIG. 3 also shows the U-shaped curves that make-up the serpentine section 30.

Figure 5:
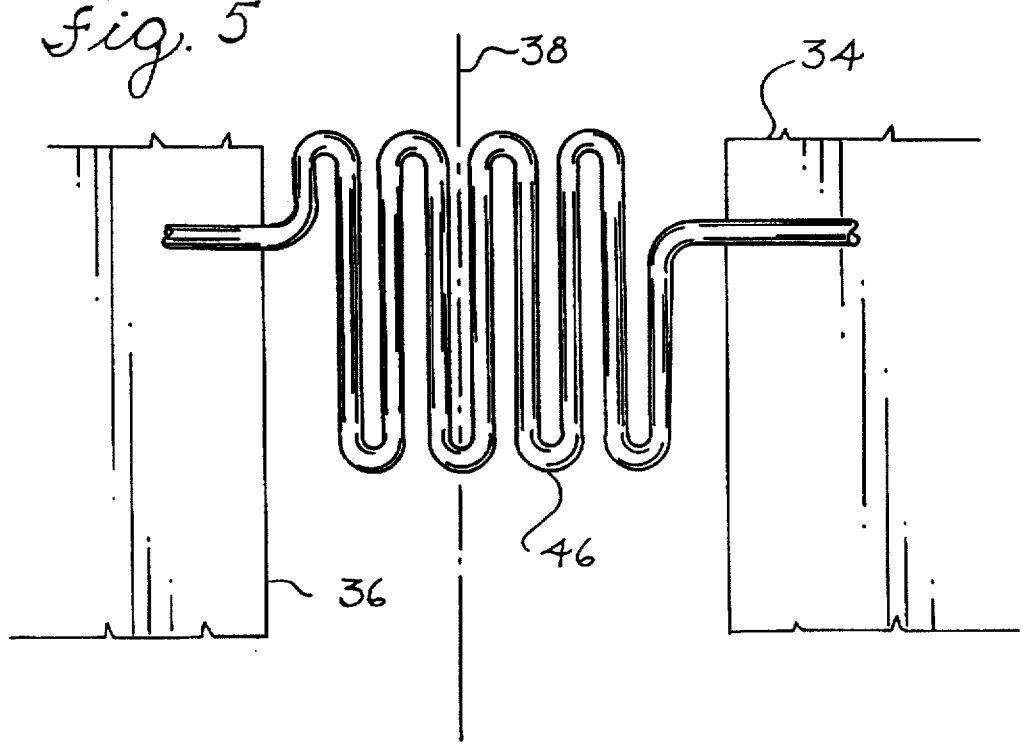
FIG. 5 is a top view of the serpentine section of FIG. 4 in the deployed position, in accord with a preferred embodiment of the invention.

FIG. 4 illustrates the path of a serpentine section 32 relative to a hinge axis 38, where portions of the serpentine section 32 are shown passing through the hinge axis 38 as the radiator deploys. In accord with the preferred embodiment, the serpentine section 32 unfolds and is connected to both a fixed radiator 36 and a deployable radiator 34. Upon the deployable radiator 34 being fully deployed, the serpentine section will lie in substantially the same plane as the deployable radiator 34. This prevents the serpentine section from overstressing, twisting or collapsing on itself, and ultimately from interfering with the heat rejection process. In the preferred embodiment, the serpentine sections are positioned such that they will not make contact with a hinge, notwithstanding that a radiator is in the stowed or deployed positions. FIG. 5 is a top of view of the serpentine section 32 of FIG. 4, in the deployed position.

In an exemplary operation of a serpentine section in a deployable radiator design, the payload structure during launch will have a deployable radiator folded or stowed over a fixed radiator panel. The fixed radiator panel will have heat pipes that are in thermal communication with the heat sources within the spacecraft. After launch, a deployable radiator, is deployed by opening launch locks. A serpentine section attached to the fixed radiator panel and the deployable radiator is a bias for deployment of the radiator as the serpentine section unfolds. As the serpentine section unfolds, portions of it will pass through the axis of rotation of the hinge. Upon the radiator being fully deployed, the serpentine section will lie substantially in the same plane as the deployable radiator. The heat pipes will then transfer heat energy from heat source modules to the fixed radiator panel and to the external deployable radiator, whereby the heat may be rejected from the spacecraft.

It is therefore intended that the foregoing detailed description be regarded as illustrative rather than limiting, and that it be understood that it is the following claims, including all equivalents, which are intended to define the scope of the invention.

What is claimed is:

1. An apparatus for a deployment application, comprising:
    a deployable structure external to a payload structure;
    a hinge permitting said deployable structure to rotate about a predetermined axis with respect to said payload structure; and
    at least one flexible section, connected on one end to said payload structure and on the other end to said deployable structure, and having a serpentine configuration including a plurality of U-shaped curves;
    said at least one flexible section retaining said serpentine configuration while in a deployed position;
    said at least one flexible section decompressing from a compressed stowed position to the deployed position and said at least one flexible section assisting in the deployment of said deployable structure while said at least one flexible section decompresses.

2. The apparatus for a deployment application of claim 1, wherein a portion of said at least one flexible section passes through said predetermined axis as said deployable structure rotates.

3. The apparatus for a deployment application of claim 1, wherein substantially all of said at least one flexible section lies in substantially the same plane as said deployable structure after said deployable structure rotates.

4. The apparatus for a deployment application of claim 1, wherein said at least one flexible section is made of a flexible metal.

5. The apparatus for a deployment application of claim 1, wherein said at least one flexible section is made of aluminum.

6. The apparatus for a deployment application of claim 1, wherein said deployable structure is a radiator.

7. A method of deploying a deployable structure from a payload structure, comprising the steps of:
    providing at least one flexible section having a serpentine configuration including a plurality of U-shaped curves;
    connecting said deployable structure by a hinge having a fixed axis to said payload structure;
    attaching said at least one flexible section to said deployable structure and to said payload structure;
    forming an arc with a portion of said at least one flexible section;
    securing said deployable structure to said payload structure with a lock;
    unsecuring said lock after launching said deployable structure;
    rotating said deployable structure around said fixed axis;
    unfolding said at least one flexible section from a compressed stowed position to a deployed position, said at least one flexible section retaining said serpentine configuration while in said deployed position; and
    employing said at least one flexible section to assist in the deployment of said deployable structure during the unfolding of said at least one flexible section.

8. The method of deploying a deployable structure from a payload structure of claim 7 wherein a portion of said at least one flexible section passes through said axis as deployable structure rotates.

9. The method of deploying a deployable structure from a payload structure of claim 7 wherein said deployable structure is a radiator.

10. The method of deploying a deployable structure from a payload structure of claim 7, wherein substantially all of said at least one flexible section lies in substantially the same plane as said deployable structure after said deployable structure rotates.

11. An apparatus for deploying a structure from a payload structure of a spacecraft, the apparatus comprising:
    a deployable structure external to said payload structure of said spacecraft for rejecting heat from said spacecraft;
    a hinge permitting said deployable structure to rotate about a predetermined axis with respect to said payload structure of said spacecraft; and
    at least one flexible section, connected on one end to said payload structure of said spacecraft and on the other end to said deployable structure, and having a serpentine configuration including a plurality of U-shaped curves;
    said at least one flexible section retaining said serpentine configuration while in a deployed position;
    said at least one flexible section performing a function selected from the group consisting of receiving vapor from said spacecraft and guiding liquid toward said spacecraft.

12. The apparatus of claim 11 wherein:
    said spacecraft comprises a fixed radiator panel; and
    said end of said at least one flexible section attached to said payload structure of said spacecraft is attached to said fixed radiator panel.

13. The apparatus of claim 12 wherein said deployable structure comprises a deployable radiator.

14. The apparatus of claim 13 wherein:
    said deployable radiator is folded in a stowed position over said fixed radiator panel during launch of the spacecraft.

15. The apparatus of claim 14 wherein:
    said spacecraft comprises launch locks for locking said deployable radiator in said stowed position during launch.

16. The apparatus of claim 11 wherein said deployable structure comprises a deployable radiator.

17. The apparatus of claim 11 wherein:
    said at least one flexible section decompresses from a compressed stowed position to the deployed position, and said at least one flexible section assists in the deployment of said deployable structure while said at least one flexible section decompresses.

18. A method of deploying a deployable structure from a payload structure of a spacecraft, comprising the steps of:
    providing at least one flexible section having a serpentine configuration including a plurality of U-shaped curves;
    connecting said deployable structure by a hinge having a fixed axis to said payload structure of said spacecraft, said deployable structure including means for rejecting heat from said spacecraft;
    attaching said at least one flexible section to said deployable structure and to said payload structure of said spacecraft;
    forming an arc with a portion of said at least one flexible section;
    unfolding said at least one flexible section from a compressed stowed position to a deployed position, said at least one flexible section retaining said serpentine configuration while in said deployed position; and
    transporting one of liquid and vapor through a portion of said at least one flexible section.

19. The method of claim 18 wherein said means for rejecting heat from said spacecraft comprises a radiator.

20. The method of claim 18 further comprising the steps of:

secusing said deployable structure to said payload structure of said spacecraft with a lock after forming an arc with a portion of said at least one flexible section;

unsecuring said lock after launching said deployable structure; and rotating said deployable structure around said fixed axis.

21. The method of claim 20 wherein said means for rejecting heat from said spacecraft comprises a radiator.

22. The method of claim 18 comprising the step of:

employing said at least one flexible section to assist in the deployment of said deployable structure during the unfolding of said at least one flexible section.

* * * * *